(12) United States Patent
Isaksson

(10) Patent No.: US 6,787,812 B2
(45) Date of Patent: Sep. 7, 2004

(54) ACTIVE OPTICAL DEVICE

(75) Inventor: Jan Isaksson, Taby (SE)

(73) Assignee: Zarlink Semiconductor AB, Jarfalla (SE)

(*) Notice: Subject to any disclaimer, the term of this patent is extended or adjusted under 35 U.S.C. 154(b) by 35 days.

(21) Appl. No.: 10/081,424

(22) Filed: Feb. 22, 2002

(65) Prior Publication Data

US 2002/0117679 A1 Aug. 29, 2002

(51) Int. Cl.$^7$ .................. H01L 29/26; H01L 29/22; H01L 23/495
(52) U.S. Cl. .................. 257/98; 257/79; 257/99; 257/666
(58) Field of Search .............. 257/666, 79, 98, 257/99, 676, 734

(56) References Cited

U.S. PATENT DOCUMENTS

| | | | | |
|---|---|---|---|---|
| 3,781,611 A | * | 12/1973 | Loro | 257/692 |
| 4,355,321 A | * | 10/1982 | Yeats | 257/434 |
| 4,636,647 A | * | 1/1987 | Nishizawa | 250/551 |
| 4,663,652 A | * | 5/1987 | Nishizawa | 257/782 |
| 5,008,788 A | * | 4/1991 | Palinkas | 362/231 |
| 5,200,631 A | * | 4/1993 | Austin et al. | 257/570 |
| 5,416,872 A | | 5/1995 | Sizer, II et al. | |
| 5,436,997 A | * | 7/1995 | Makiuchi et al. | 385/92 |
| 5,519,524 A | * | 5/1996 | Fergason et al. | 349/149 |
| 5,574,814 A | | 11/1996 | Noddings et al. | |
| 5,719,979 A | * | 2/1998 | Furuyama | 385/89 |
| 5,881,945 A | * | 3/1999 | Edwards et al. | 228/124.6 |
| 5,917,976 A | | 6/1999 | Yamaguchi | |
| 5,925,898 A | * | 7/1999 | Spath | 257/98 |
| 5,946,062 A | * | 8/1999 | Hasegawa et al. | 349/58 |
| 6,049,975 A | * | 4/2000 | Clayton | 29/832 |
| 2001/0015480 A1 | * | 8/2001 | Maund | 257/673 |
| 2002/0021871 A1 | * | 2/2002 | Auburger et al. | 385/88 |

FOREIGN PATENT DOCUMENTS

| | | |
|---|---|---|
| DE | 196 43 911 | 10/1996 |
| JP | 10-56163 | * 2/1998 |
| JP | 2001-177081 | * 6/2001 |

OTHER PUBLICATIONS

Wipiejewski et al, "Efficient Alignment Tolerance Coupling of Vertical–Cavity Lasers to Single–Mode Fibers", Proceedings of The European Conference on Sep. 12–16, 1993, Regular Papers, Zurich, vol. 2, Conf. 19, pp. 333–336.

Duthie et al., "Passively Aligned Four–Channel Reflective InP MQW Modulator Transmitter", Electronics Letters, Jul. 6, 1999, IEE Stevenage, GB, vol. 31, NR. 14, pp. 1177–1179.

Holm et al., "Through–Etched Silicon Carriers for Passive Alignment of Optical Fibers to Surface–Active Optoelectronic Components", Sensors and Actuators A, Elsevier Sequoia S.A., Lausanne, CH, vol. 82, Nr. 1–3, pp. 245–248.

Morozov et al., "Tolerance Analysis for Three–Dimensional Optoelectronic Systems Packaging", Optical Engineering, Soc. of Photo–Optical Instrumentation Engineers, Bellingham, U.S., vol. 35, Nr. 7, pp. 2034–2043.

Kuznia et al., "Flip Chip Bonded Optoelectronic Devices on Ultra–Thin Silicon–on–Sapphire," 2000, Optical Society of America, USA.

Peters et al., "10 Gb/s VCSEL–based data links," Proceedings of SPIE, 2000, pp 152–164, vol. 3946.

\* cited by examiner

*Primary Examiner*—David E. Graybill
*Assistant Examiner*—James M. Mitchell
(74) *Attorney, Agent, or Firm*—Lawrence E. Laubscher, Jr.

(57) ABSTRACT

A method is disclosed for making an active optical device for coupling to optical fibers. Arrays of contacts are formed on the rear face of a substrate, which is preferably transparent, at precisely defined locations. Components are then flip-chip bonded onto the substrate using a solder alignment technique to attach the components to said substrate in precisely predetermined locations determined by the arrays of contacts. At least one of the components is a light emitter or receiver so that it can be optically coupled through the transparent substrate to an external light guide on the front face of the substrate. Preferably, a guide frame for positioning guide pins is bonded to the substrate also using a solder alignment technique.

19 Claims, 1 Drawing Sheet

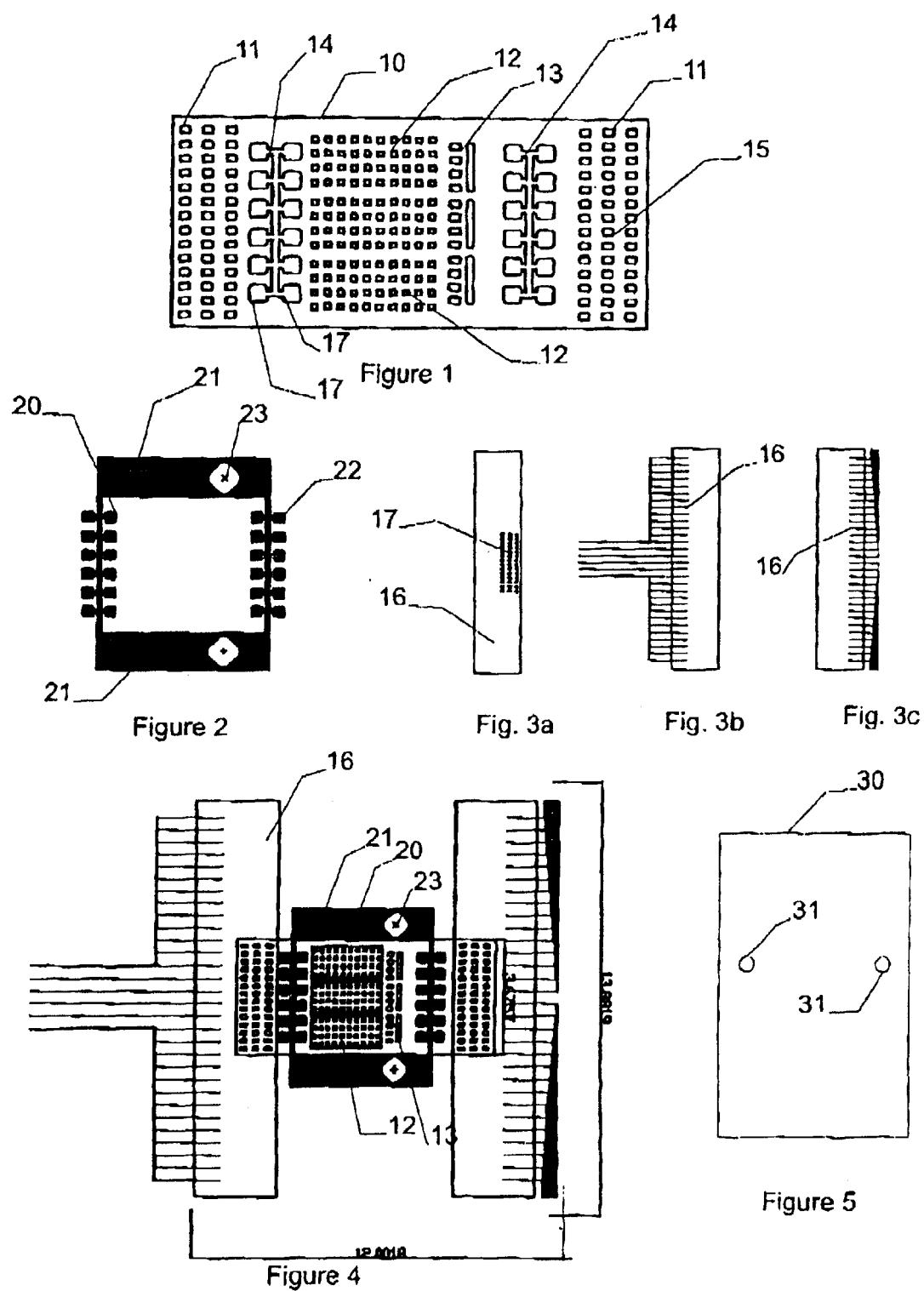

ACTIVE OPTICAL DEVICE

BACKGROUND OF THE INVENTION

1. Field of the Invention

This invention relates to the field of fiber optics, and more particularly to an active optical device, such as a transmitter and/or receiver device for coupling to an external light guide, such as an optical fiber cable.

2. Description of Related Art

In the field of optical fiber transmission, optical devices are needed to generate light for transmission into, and receive light from, the optical fibers. The actual transmitting devices are typically VCSELS (Vertical Cavity Surface Emitting Lasers), which are highly efficient semiconductor light emitting devices. These optical devices need to be associated with driver circuits that supply the appropriate current to modulate the lasers. The receivers are typically PIN diodes, which also need to be associated with appropriate driver circuitry to demodulate the received light signals. Tie drivers must be electrically connected to external circuits.

VCSELS typically are arranged in banks of four on a single chip. In the prior art, it is known to mount them on a "lead frame", which consists of a metal frame, usually made of nickel, having separate leads that connect the individual VCSELs to their respective driver circuits. Prior art devices operating at 2.5 Gbps typically have their VCSELs mounted on the end face of a solid rectangular metal block that acts as a heat sink. A printed circuit containing the driver chips is mounted on one face of the heat sink, and the lead frame bonded to the heat sink connects the driver chips to the VCSEL contacts. The end face of the heat sink has protruding guide pins that precisely locate a fiber optic ferrule relative to the VCSELs so that the optic fibers contained in the optic fiber cable are respectively aligned with the individual optical components, whether they transmitters or receivers. The driver chips should be mounted as close to the VCSELs as possible to minimize parasitic effects. In the prior art, this is achieved by mounting them at the end of the metal block forming the heat sink.

While the above arrangement works well at 2.5 Gbs, there is an ever increasing desire to increase speed, and a new generation of devices will operate at 10 Gbs. These new devices create a need for a further improvement in parasitic performance, and in particular require the drivers to be mounted even closer to the VCSEL light sources.

SUMMARY OF THE INVENTION

The invention departs from the traditional method described above and mounts all the components on a substrate, typically made of glass or sapphire, using a solder alignment technique to mount the components in precise and close proximity. Unlike the prior art, light transmission takes place through the transparent substrate with the components being mounted on th)e rear face and the light guide being attached to the front face by means of guide pins protruding on either side of the transparent substrate.

Accordingly in a first aspect the invention provides a method of making an active optical device for coupling to an external light guide, comprising the steps of providing a substrate providing a light path therethrough and having a front face and a rear face; providing a plurality of components for attachment to die rear face of said substrate, each said active component having a face presenting an array of contacts, said components including at least one optical component selected from the group consisting of a light emitter and light receiver; forming a plurality of arrays of contacts on the rear face of said transparent substrate at precisely defined locations corresponding to an intended location of the contacts of each component; flip-chip bonding said components onto said substrate using a solder alignment technique to attach said components to said substrate in precisely predetermined locations determined by said arrays of contacts; and said at least one optical component being oriented so that it can be optically coupled through said transparent substrate to the external light guide.

Ideally, the substrate is transparent to the operating wavelength, although if necessary holes can be forced in the substrate to create a light path therethrough.

The active optical components can be VCSEls (Vertical Cavity Surface Emitting Lasers) serving as light emitters and PIN diodes serving as light receivers. The device is designed for use at 10 Gbs at a wavelength of 850 nm, although it is also useful at other speeds and wavelengths, including 240 Gbps.

It will be understood by one skilled in the art that fiber optic transmission can occur in the visible and non-visible portions of tile spectrum, and the terms "optical" and "light" are used herein to include those portions of the spectrum, including infrared and ultraviolet, normally used for fiber optic transmission whether visible or not.

The substrate can be any suitable material, but it is ideally transparent to the operating wavelength to avoid the need to form holes, and glass or sapphire are preferred. Sapphire is the most preferred due to its beat transmission properties.

Typically, the substrate is first patterned to provide the conductive tracks in a conventional manner, and then solder nodules known as "bumps" are applied by deposition through a mask to permit the components to be attached by flip-chip bonding. Alternatively, the bumps can be applied to the corresponding contacts on the components, or both. Flip-chip bonding is a technique, for example, described in U.S. Pat. No. 6,190,940, incorporated herein by reference, wherein chips are bonded "upside down" directly onto a substrate. Matching contacts are present on the substrate and chip, and solder bumps are deposited on the substrate, the chip or both. The parts are brought together and the solder heated. As the solder melts, it draws the parts into precise alignment by surface tension effects and also bonds them together. The solder bumps, as is known in the art, are typically made of a gold/tin or gold/tin/lead alloy.

By mounting the components on a substrate using flip-chip bonding techniques and having the light exit from the other side of the substrate, it is possible to mount them to very fine tolerances and also to bring the driver circuits into close proximity with the active optical components.

A remaining problem is how to align the ferrule containing the optic fibers providing the external light guide with the VCSELs. This is achieved by using the same solder alignment technique to mount a guide frame, typically made of plated nickel, on the rear side of the substrate. Solder bonding pads are laid out in a predetermined pattern, and the guide frame has matching pattern which is solder aligned with the bonding pads. The guide frame has wing portions overhanging the side of the substrate, and the wing portions contain indicia, preferably in the form of through-holes, marking the location of the guide pins. Thus, in a final step, when a heat sink, typically a block of highly conductive metal, is applied to the rear side of the substrate, the guide pins, which protrude from the heat sink and pass on each side of the substrate, can be aligned relative to the rest of the components, and more particularly the optical components, by passing them through the guide holes in the guide frame.

In another aspect the invention provides an active optical device comprising a substrate with a light path therethrough and having a front face and a rear face; a plurality of components solder bonded to the rear face, said components including at least one active optical component located so that it can be coupled through the transparent substrate to in external light guide; a guide frame solder bonded to the rear face of the substrate; and a heat sink having guide pins bonded on the rear side of said substrate, said guide pins protruding forward to engage recesses in an external light guide coupling.

BRIEF DESCRIPTION OF THE DRAWINGS

The invention will now be described in more detail, by way of example only, with reference to the accompanying drawings, in which;

FIG. 1 is a plan view of the rear side of a transparent substrate prior to attachment of the components;

FIG. 2 is a plan view of a guide frame for locating guide pins;

FIG. 3a is a plan view of the contact side of a fan-out substrate, and FIGS. 3b and 3c show the exposed sides of the fan-out substrates when they are mounted in position;

FIG. 4 is a plan view of the top side of a partially complete assembly; and

FIG. 5 is a plan view of the front side of a heat sink showing the guide pins.

DETAILED DESCRIPTION OF THE PREFERRED EMBODIMENTS

In accordance with the principles of the invention, solder alignment is used to precisely locate components on the rear side of a substrate. Preferably the substrate is transparent, in which case optical transmission takes normally takes place through the substrate to an external guide, which typically is terminated by a fiber optic ferrule located by guide pins protruding forwardly from the device. However, if the substrate is not transparent, or is insufficiently transparent at the operating wavelengths, it is possible to drill holes in the substrate to create a light path through it.

Referring now to FIG. 1, a substrate 10 is transparent to the operating wavelength of the optical device, typically 850 nm. The substrate 100 is preferably of sapphire for its heat transmissive properties, but it could be of other transparent materials, such as glass. The key requirement is that it should be transparent to the operating wavelength of the device, otherwise as noted above it will be necessary to drill holes through the substrate to create a light path through it.

In the first step of the process, the substrate 10 is patterned using a conventional photolithographic technique to lay out conductive tracks which are not shown in the drawings. These tracks connect the driver circuits to the VCSELS or PIN diodes and to a fan-out substrate, which serves to provide external electrical connections. Next a mask (not shown) is applied and solder bumps 15, for example, made of an alloy of gold/tin or gold/tin/lead, arc applied in arrays on the sapphire substrate 10. Most of tie solder bumps 15 are located at the terminal ends of the conductive tracks, although some additional bumps are provided for bonding to a guide frame as will be described in more detail.

End arrays 11 consist of a rectangular array of solder bumps for establishing connection with a fan-out substrate 16 shown in FIGS. 3a to 3c. As shown in FIG. 3a, the fan-out substrate 16 has matching contacts 17 on the underside, which may or may not also have solder bumps. Similarly, arrays 12 of solder bumps are laid out where the driver chips are to be located, and arrays 13 correspond to the locations of the VCSELs or the PIN diode receivers. The bumps correspond precisely to the location of the matching contacts on the underside of the driver chips and optical devices. The driver chips can, for example, be those sold be AMCC corporation. The solder bumps are interconnected in the desired electrical arrangement by conductive tracks formed on the surface of the substrate. These conductive tracks are not shown in the drawing to avoid excessive clutter.

It will be understood that in accordance with flip-chip bonding techniques, the solder bumps can be formed on the substrate, the matching contacts of the components to be applied, or both.

Next, guide pad arrays 14 are formed on either side of the driver chip and VCSEL arrays 12, 13. These consist of opposed pairs of pads 17 extending on either side of a linear track and forming a predetermined shape designed to ensure precise alignment of the parts during solder bonding. The guide pad arrays 14 are very precisely positioned with respect to the substrate and in particular with respect to the VCSEL arrays 14. The pads 17 are in the form of solder bumps similar to those forming the component arrays.

As shown in FIG. 2, a rectangular guide frame 20 has a pair of wing portions 21 and side edges 22 having an array of contact pads 22 precisely matching the arrays 14. The pads 22 are exactly the same size and shape as the pads 17 on the substrate 10. A pair of indicia 23, which may be simple marks, but are preferably holes, are formed in the wing portions 21.

In the next step, the fan-out substrates 16 are flip-chip bonded to the substrate 10 along with the guide frame 20. In this technique, the components are inverted with their contact arrays facing the respective arrays of solder bumps 11, 14, 15, and the assembly is heated to melt the solder bumps. The components are located as precisely as possible mechanically, but the final alignment results from the chips "floating" into place on the molten solder due to surface tension effects as is known per se in the prior art. The shaped pads 22, 17 ensure that the guide frame is very precisely located relative to the substrate. This is important because the location of the guide frame is critical to ensure the ultimate positioning of the optic fibers relative to the active optical components.

The wing portions 21 of the guide frame 20 overhang the side edges of the transparent substrate 10 as shown in the partly assembly view in FIG. 4. The wing portions contain the indicia 23, preferably in the form of holes, to mark the locations of the guide pins.

The fan-out substrates 16 are essentially glass plates having conductive tracks patterned on the underside in a fan-out manner and terminating in contacts matching the arrays of solder bumps on the substrate 10. The tracks lead to flex-card electrical connectors.

Once the guide frame 106 has been solder bonded in place, the driver chips and active optical components can be added. This are flip-chip bonded in the same manner as above onto the arrays 12, 13. The drivers are located in very close proximity to the active optical components.

Finally, a heat sink 30, (shown in FIG. 5) usually in the form of a solid metal rectangular block, with pins 31 protruding on its front side is bonded, typically by gluing, onto the partly assembled device. The guide pins (not shown) are passed through the holes 23 in the guide frame to ensure that they are precisely located.

The entire device can then be mounted in a suitable housing for receiving the fiber optic ferrule on the front face of the substrate 10, which can be precisely located relative to the optical components by the protruding guide pins. The transmission of light takes place through the substrate 10 either due to its transparency, or if necessary through holes drilled to form a light path.

It will be appreciated that the order of assembly of the components onto the substrate is generally not important, although clearly the heat sink must be applied after tile application of the guide frame and other components. Typically the driver circuits, VCSELs and fan-out substrates are mounted on the main substrate at the same time.

It will also be appreciated by one skilled in the art that many other shapes of array can be used for the guide frame. The important point is that the guide frame be precisely aligned with the transparent substrate using a solder alignment technique in order to permit subsequent precise alignment of the guide pins that are attached to the heat sink relative to the active optical components when the heat sink is applied to the device.

The inventive arrangement permits the driver circuits to be mounted extremely close to the active optical components, thereby achieving good performance at very high speeds in the order of 10 Gbs per channel.

I claim:

1. A method of making an active optical device for coupling to an external light guide, comprising the steps of:
   providing a substrate with a light path therethrough and having a front face and a rear face;
   said component having a face presenting an array of contacts, said components including at least one actives optical component selected from the group consisting of a light emitter and light receiver;
   forming a plurality of arrays of contacts on the rear face of said transparent substrate at precisely defined locations corresponding to an intended location of the contacts of each component;
   forming arrays of positioning pads on said rear face of said transparent substrate at precisely defined locations relative to said plurality of arrays of contacts;
   providing a guide frame for locating the external light guide and having guide frame pads precisely matching said arrays of positioning pads;
   attaching said guide frame to said rear face of said substrate in a precise location determined by said positioning pads by soldering said guide frame pads to said arrays of positioning pads and floating said guide frame into place on molten solder; and
   flip-chip bonding said components onto said substrate in precisely predetermined locations determined by said arrays of contacts by floating said components into said precisely determined locations on molten solder; and
   wherein said at least one optical component is oriented so that it can be optically coupled through said substrate to the external light guide.

2. A method as claimed in claim 1, wherein said substrate is transparent to an operating wavelength of the device to permit light to pass therethrough.

3. A method as claimed in claim 1, wherein holes are provided in said substrate to permit light to pass therethrough.

4. A method as claimed in claim 1, wherein said positioning pads comprise solder bumps for use in the solder alignment of said guide frame to said substrate.

5. A method as claimed in claim 1, wherein said positioning pads are arranged in opposed pairs extending on either side of a line.

6. A method as claimed in claim 1, wherein said arrays of contacts on said substrate comprise solder bumps for use in the solder alignment of said components to said substrate.

7. A method as claimed in claim 6, wherein said components include at least one driver circuit for said at least one optical component.

8. A method as claimed in claim 7, wherein said components further include a fan-out substrate having contacts for establishing electrical connection with the device.

9. A method as claimed in claim 1, wherein said substrate is made of glass.

10. A method as claimed in claim 9, wherein said substrate is made of sapphire.

11. A method as claimed in claim 1, wherein said guide frame is made of nickel.

12. A method as claimed in claim 1, further comprising bonding a heat sink on said substrate over said components and said guide frame, said heat sink including on a front side thereof facing the rear face of said substrate protruding guide pins for aligning said substrate with said external light guide, said guide pins being aligned with the aid of said guide frame.

13. A method as claimed in claim 12, wherein said guide frame contains holes located to permit said guide pins to pass through, said holes being located in wing portions of said guide frame extending beyond side edges of said substrate.

14. A method as claimed in claim 1, wherein said at least one active optical component is a VCSEL.

15. A method of making an active optical device for coupling to optical fibers, comprising the steps of:
   providing a transparent substrate having a front face and a rear face;
   providing a plurality of active components for attachment to the rear face of said substrate, each said active component having face presenting an array of contacts, said components including at least one optical component selected from the group consisting of a light emitter and light receiver;
   forming a plurality of arrays of solder bumps on the rear face of said transparent substrate at precisely defined locations corresponding to an intended location of the contacts of each component;
   providing a guide frame having at least one array of shaped pads;
   forming at least one array of solder pads on the rear face of said substrate at precise locations for locating a guide frame, said solder pads being matched to said shaped pads of said guide frame.
   flip-chip bonding said components onto the rear face of said substrate using a solder alignment technique to attach said components to said substrate in precisely predetermined locations determined by said arrays of solder bumps;
   said at least one optical component being oriented so that it can be optically coupled through said transparent substrate to an external light guide on the front face thereof; and
   bonding said guide frame to said substrate using a solder alignment technique to locate said guide frame in a precise position by aligning said shaped pads with said solder pads, said guide frame including indicia marking the location of guide pins for said external light guide.

16. A method as claimed in claim 15, wherein said guide frame includes wing portions overhanging side edges of said substrate, said indicia being in said wing portions.

17. A method as claimed in claim 15, wherein said indicia are in the form of holes through which the guide pins can pass.

18. A method as claimed in claim 17, further comprising bonding a heat sink supporting said guide pins to said rear face of said substrate over said guide frame and said components.

19. A method of making an active optical device for coupling to an external light guide, comprising the steps of:

provinding a substrate with a light path therethrough and having a front face and a rear face;

providing a plurality of components for attachment to the rear face of said substrate, each said component having a face presenting an array of contacts, said components including at least one active optical component selected from the group consisting of a light emitter and light receiver;

forming a plurality of arrays of contacts on the rear face of said transparent substrate at precisely defined locations corresponding to an intended location of the contacts of each component;

flip-chip boding said components onto said substrate using a solder alignment technique to attach said components to said substrate in precisely predetermined location determined by said arrays of contacts, said at least one optical component being oriented so that it can by optically coupled through said substrate to the external light guide;

forming arrays of positioning pads on said rear surface of said transparent substrate at precisely defined locations relative to said plurality of array of contacts;

providing a guide frame for locating the external light guide and having guide frame pads precisely matching said arrays of positioning pads;

attaching said guide frame to said rear face of said substrate in a precise location determined by said positioning pads by soldering said guide frame pads to said arrays of positioning pads and floating said frame into place on molten solder;

bonding a heat sink on said substrate over said components and said guide frame, said heat sink including on a front side thereof facing the rear face of said substrate protruding guide pins for aligning said substrate with said external light guide, said guide pins being aligned with the aid of said guide frame; and wherein said guide frame contains holes located to permit said guide pins to pass through, said holes being located in wing portions of said guide frame extending beyond side edges of said substrate.

* * * * *